United States Patent
Pearson et al.

(10) Patent No.: US 10,928,179 B1
(45) Date of Patent: Feb. 23, 2021

(54) ROLL ADJUSTMENT SYSTEM

(71) Applicants: Alex Pearson, Sioux Falls, SD (US);
Blake Sandnes, Sioux Falls, SD (US);
Larry Rossow, Sioux Falls, SD (US)

(72) Inventors: Alex Pearson, Sioux Falls, SD (US);
Blake Sandnes, Sioux Falls, SD (US);
Larry Rossow, Sioux Falls, SD (US)

(73) Assignee: Pearson Incorporated, Sioux Falls, SD (US)

(*) Notice: Subject to any disclaimer, the term of this patent is extended or adjusted under 35 U.S.C. 154(b) by 0 days.

(21) Appl. No.: 14/821,936

(22) Filed: Aug. 10, 2015

(51) Int. Cl.
*B02C 4/38* (2006.01)
*G01B 7/14* (2006.01)

(52) U.S. Cl.
CPC . *G01B 7/14* (2013.01); *B02C 4/38* (2013.01)

(58) Field of Classification Search
CPC .................................. G01B 7/14; B02C 4/32
USPC .................................................. 324/72–72.5
See application file for complete search history.

(56) References Cited

U.S. PATENT DOCUMENTS

| | | | | |
|---|---|---|---|---|
| 5,533,371 A * | 7/1996 | Frischknecht | .......... | B21B 38/10 |
| | | | | 33/657 |
| 5,700,179 A * | 12/1997 | Hasegawa | ................. | B24B 7/06 |
| | | | | 451/41 |
| 6,258,305 B1 * | 7/2001 | Brinker | ................ | B01J 13/0091 |
| | | | | 264/101 |
| 7,832,241 B2 * | 11/2010 | Mantovan | ............. | B21B 38/105 |
| | | | | 72/10.7 |
| 8,206,061 B1 * | 6/2012 | Hansen | ................. | E01C 19/286 |
| | | | | 404/128 |
| 8,485,052 B2 | 7/2013 | Gebhart | | |
| 8,734,143 B2 | 5/2014 | Morris | | |
| 2002/0168911 A1 * | 11/2002 | Tonner | .............. | A61F 13/00042 |
| | | | | 442/405 |
| 2010/0030926 A1 * | 2/2010 | Roussy | ................. | A61B 5/1115 |
| | | | | 710/18 |
| 2011/0067374 A1 * | 3/2011 | James | ................. | A01F 15/0715 |
| | | | | 56/341 |
| 2013/0271110 A1 * | 10/2013 | Yamanaka | ............. | G01N 27/00 |
| | | | | 324/72 |
| 2014/0145018 A1 | 5/2014 | Niklewski | | |

(Continued)

FOREIGN PATENT DOCUMENTS

WO 2005119089 12/2005
WO 2007066847 6/2007

*Primary Examiner* — Jeff W Natalini
(74) *Attorney, Agent, or Firm* — Jeffrey A. Proehl; Woods, Fuller, Shultz & Smith, PC (57) ABSTRACT

A system may comprise a frame, a pair of rolls with each of the rolls comprising a roll body having opposite ends and a circumferential surface, a plurality of teeth being formed on the circumferential surface, and at least a portion of the circumferential surface being electrically conductive. The roll may also have a roll shaft having end portions extending from the roll body, with each of the end portions extending from one of the ends of the roll body. The system may also comprise roll supports configured to support the rolls on the frame in a manner such that at least one of the rolls is movable to adjust a separation gap between the rolls, a detection apparatus configured to detect contact between the rolls, and a signaling apparatus configured to produce a signal indicating a change in electrical potential is detected by the detection apparatus.

1 Claim, 7 Drawing Sheets

(56) References Cited

U.S. PATENT DOCUMENTS

| | | | |
|---|---|---|---|
| 2015/0129698 A1* | 5/2015 | Olson | B02C 18/16 241/230 |
| 2015/0300800 A1* | 10/2015 | VanValkenburgh | G01S 17/88 324/207.17 |
| 2017/0027105 A1* | 2/2017 | Wenger | A01D 45/025 |

* cited by examiner

ROLL ADJUSTMENT SYSTEM

BACKGROUND

Field

The present disclosure relates to adjustable rolls such as can be used on grinding equipment and more particularly pertains to a new roll adjustment system for detecting the zero point for a movable roll more safely and accurately.

Description of the Prior Art

In machinery utilizing rolls or rollers (the terms being used interchangeably in this description), such as grain processing apparatus, the rolls typically have teeth formed on the substantially cylindrical outer surface to grind or substantially pulverize the grain particles passing between a pair of the rolls, or multiple pairs of rolls arranged in series with respect to each other. The separation gap between the pair of rolls is very important to achieving a ground product that has the desired particle size and consistency. However, the separation gap needs to be changed or adjusted from time to time due to, for example, a desired change in the character of the output product, loss of the proper position adjustment of the rolls, wear on the parts of the apparatus (e.g., the teeth on the rolls), as well as other reasons.

For example, during startup of the grinding apparatus, the roll separation gap is typically adjusted to a suitable or desired setting. To do so, a proper zero location or point for the movable roll must be determined from which the separation gap may be measured. The zero location may be defined as the position of the movable roll in which the movable and stationary rolls are in contact with each other, or at least the ends of the rolls are in contact with each other, such that the rotation axes of the rolls are presumed to be substantially parallel.

The zero location is thus determined by detecting when the rolls just contact each other. Due to variations in the frame structure of the apparatus and the rolls themselves, the ends of the movable roll often are adjusted independently of each other to establish a zero point for each end. Then adjustment of the separation gap may be made between the corresponding ends of the rolls based upon those zero points. In some apparatus, the separation gap between the rolls may be adjusted by moving the position of the bearings supporting the ends of the movable roll. Each of these bearings may include a spring-loaded mount in which a threaded bolt or rod is used to adjust the position of the bearing of the movable roll with respect to the other (stationary) roll. Rotation of the bolt or rod moves the bearing, and the corresponding end of the movable roll, closer to or further away from the stationary roll depending upon the direction of rotation of the bolt or rod.

The process of adjusting the separation gap between the rolls may initially entail operating the apparatus so that the rolls rotate in a spaced relationship of (usually) unknown separation gap, and then moving one end of the rotating movable roll relatively closer to the rotating stationary roll until contact is detected between the movable and stationary rolls. The point at which contact is detected is considered to be the zero point for that end of the movable roll, and the same procedure is performed for the other end of the movable roll to establish a zero point for that end.

Accurately detecting the initial point of contact between the rotating rolls can be difficult. One way of detecting contact (or imminent contact) requires the insertion of a feeler gauge between the movable and stationary rolls, and when a feeler gauge can no longer be inserted between the rolls, contact between the rolls is detected and the zero point is identified. Another way of detecting contact requires the operator to listen for the sound produced by the initial contact of the rotating rolls as the moving roll moves toward the stationary roll, to thereby identify the zero point.

SUMMARY

The present disclosure relates to a system comprising a frame, a pair of rolls including a first roll and a second roll. The rolls may comprise a roll body having opposite ends and a circumferential surface, a plurality of teeth formed on the circumferential surface, and at least a portion of the circumferential surface being electrically conductive. The rolls may also comprise a roll shaft having end portions extending from the roll body with each of the end portions extending from one of the ends of the roll body. Roll supports may be configured to support the rolls on the frame in a manner such that at least one of the rolls is movable to adjust a separation gap between the rolls. The system may also include a detection apparatus configured to detect contact between the rolls, and a signaling apparatus configured to produce a signal when the detection apparatus detects contact between the rolls.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 5 thereof, a new roll adjustment system embodying the principles and concepts of the disclosed subject matter will be described.

The applicants have recognized that problems exist with the known techniques for zeroing, or finding the zero location, for a movable roll of a pair of rolls of an apparatus in that the techniques may not be very accurate in establishing a zero point and may be hazardous to the operator attempting to perform the zeroing operation. For example, using the technique of listening for the sound of the initial contact of the rolls may be difficult to perform in the typically loud environment of a milling facility, especially for inexperienced machine operators, and a hard collision between the rolls which damages the teeth on the rolls may result. Even when the technique is performed by an experienced operator able to reliably detect the initial contact between the spinning rolls, the technique imposes additional wear to the rolls over the long term that is likely to shorten the useful life of the teeth on the roll. Using the technique of insertion of a feeler gauge between the rotating and moving rolls can also be hazardous to the operator.

In light of these problems, the applicants have developed a system and method for detecting the zero point for a pair of rolls in a manner that is believed to be more easily and accurately (and safely) performed even by those with relatively less operational experience. In some aspects of the disclosure, the pair of rolls of the apparatus effectively function as an electrical switch to complete a circuit, and completion of the circuit may be used to signal and inform the operator that the rolls have contacted each other and the movable roll is at the zero location or point relative to the stationary roll. An electrical charge may be applied to one of the rolls and the other roll is electrically isolated from the charged roll (and may also be isolated from the frame). A conductor is electrically connected to the isolated roll so that when contact is made between the rolls (e.g., between the movable and the stationary rolls) a circuit is completed and current may flow between the rolls. The completion of the circuit may provide a means for signaling or indicating that contact between the rolls has occurred, without requiring the operator to hear the contact or insert an object such as a feeler gauge. The completion of the contact detecting circuit can be performed while the rolls are rotating or not rotating. The completion of the circuit and the resulting current flow may also be employed to provide a signal to a controller or computer or other processor indicating that contact between the rolls has been made, which in turn may be used to control devices that automatically adjust the position of the movable roll to achieve the separation gap required for a particular task or operation. In this way, adjustment of the position of the movable roll, and therefore the separation gap, may be performed automatically rather by than the aforementioned manual techniques.

In some aspects, the disclosure relates to a system 10 which may have as its purpose the grinding or crushing or otherwise processing a material, typically a particulate material which may include various grains or other foodstuffs. Such apparatus may include one or more stages of grinding or processing that progressively change the grain, such as by grinding the particles into smaller and smaller sizes. It should be recognized that while the illustrative embodiments of this disclosure primarily relate to apparatus for processing particles into smaller particles, aspects of the concept may be applied to other apparatus employing rotatable objects in which a spacing therebetween is adjustable from a zero point at which the objects are in contact.

Illustrative systems 10 that may be suitable for the implementation of the aspects of the disclosure may include a frame 12 and a pair of rolls 14, 16 mounted on the frame in a manner permitting rotation of the rolls. While suitable systems may include more than one pair of the rolls, for the purposes of this description a single pair of rolls will be described with the understanding that additional pairs of rolls of a system may utilize multiple similar or identical elements. The pair of rolls may include a first roll 14 and a second roll 16 that are generally oriented substantially parallel to each other and may rotate in the same or opposite rotational directions. Each of the rolls 14, 16 may include a roll body 18 with opposite ends 20, 21 and a circumferential surface 22 extending between the ends 20, 21. Typically the circumferential surface 22 is substantially cylindrical in shape, and includes a plurality of teeth 24 that are formed on the circumferential surface which protrude outwardly to some degree from the surface 22 and are effective for the grinding or otherwise processing the material moving through the system 10. In some embodiments the teeth 24 extend from the first end 20 to the second end 21, and may be substantially straight between the opposite ends 20, 21, and may be substantially continuous between the ends, although the particular form of the teeth is not necessarily critical to the disclosure and other teeth configurations may be employed.

Each of the rolls 14, 16 may also include a roll shaft 26 that may extend through the roll body 18 and have end portions 28 which are exposed and extend from the opposite ends 20, 21 of the roll body. The end portions 28 of the roll shaft 26 may have a substantially cylindrical shape that is suitable for being journalled in a bearing for rotation with respect to the bearing.

At least a portion of the roll body 18 may be electrically conductive or able to carry an electrical current. The conductive portion may be located on the body such that the portion is likely to be the first portion of the roll that contacts the other roll when the rolls are moved toward each other from a spaced condition. Illustratively, at least a portion of the circumferential surface 22 of the body 18 may be electrically conductive, and at least some of the teeth may be electrically conductive. Typically, although not necessarily, the electrically conductive portion of the circumferential surface is formed of a conductive metal such as steel.

In the illustrative embodiments of the system 10, one of the rolls may be a stationary roll which is mounted to the frame 12 in a manner such that the stationary roll is substantially immovable with respect to the frame during normal use of the system, and the other one of the rolls is a movable roll which is mounted on the frame in a manner that permits movement of the movable roll with respect to the stationary roll. Although this is the preferred configuration for the purpose of greater simplicity, both of the rolls may be mounted on the frame in a manner that permits both rolls to move with respect to the frame. The movable roll is thus movable with respect to the frame, but is also movable with respect to the stationary roll such that the movable roll is able to move toward and away from the stationary roll to adjust a size and character of a separation gap 27 between the rolls. In some embodiments, the movable roll may be mounted on the frame 12 in a manner that permits independent movement of the ends 20, 21 with respect to the stationary roll, and also with respect to the frame, so that the magnitude of the separation gap may vary between the ends. In the illustrative embodiments of this description, the first roll 14 forms the movable roll and the second roll 16 forms the stationary roll.

The system may also include one or more roll supports, with each roll support receiving one of the end portions 28 of one of the roll shafts 14, 16 to thereby support the respective roll body on the frame in the indicated manner (e.g., movable or stationary). Each of the roll supports may include a bearing or other suitable structure for supporting a portion of a rotating shaft. The roll supports may include at least one movable roll support assembly 30 for supporting the roll shaft of the movable roll on the frame, and in embodiments a pair of movable roll support assemblies 30, 31 may be employed with each assembly supporting one of the end portions 28 of the roll shaft of the movable roll 14. The movable roll support assemblies 30, 31 may be movably mounted on the frame to permit movement of the movable roll toward and away from the stationary roll to thereby change and adjust the size of the separation gap 27 between the rolls 14, 16. As illustratively shown by a broken line in FIG. 2 of the drawings, the roll shafts may lie in a common horizontal plane as represented by the broken line.

Illustratively, each of the movable roll support assemblies 30, 31 may include a bearing block 32 which is movably mounted on the frame, and may be slidably mounted on the frame by one or more guides 34 mounted on the frame that effectively form a track for the bearing block to move toward and away from the stationary roll 16. The movable roll support assemblies 30, 31 may also include an adjustment structure 36 which is configured to adjust a position of the bearing block with respect to the stationary roll 16 and also with respect to the frame 12. An illustrative adjustment structure includes a stop 38 mounted on the frame 12, a brace 40 mounted on the bearing block 32, and an adjustment member 42 which is configured to move the brace with respect to the stop, and thereby move the bearing block with respect to the frame. The adjustment member 42 may lie in the common horizontal plane indicated by the broken line in FIG. 2 so as to act on the brace 40 and the bearing block in the common horizontal plane. A portion of the exterior of the adjustment member 42 may be threaded, and the threaded portion of the adjustment member may extend through a threaded hole in the brace 40 such that rotation of the adjustment member in a first rotational direction moves the brace toward the stop 38 and rotation of the adjustment member in a second rotational direction moves the brace away from the stop.

Each of the movable roll support assemblies 30, 31 may also include a biasing structure 44 which is configured to bias movement of the movable roll toward or away from the stationary roll 16, and may accomplish this through biasing the bearing block 32 toward or away from the roll 16. Illustratively, the biasing structure 44 may comprise a spring which is positioned between the stop 38 and the brace 40 to push the brace away from the stop and thereby urge the bearing block to move toward the stationary roll subject to the adjustment by the adjustment member 42.

The roll supports may also include a stationary roll support 46 for supporting the roll shaft 26 of the stationary roll 16. A pair of the stationary roll supports 46 may be employed to support the opposite end portions of the roll shaft, and may each comprise a bearing mounted on the frame in a manner that is configured to hold the stationary roll 16 in a fixed position on the frame during normal operation of the system, such as by being directly bolted to the frame.

Figure 1:
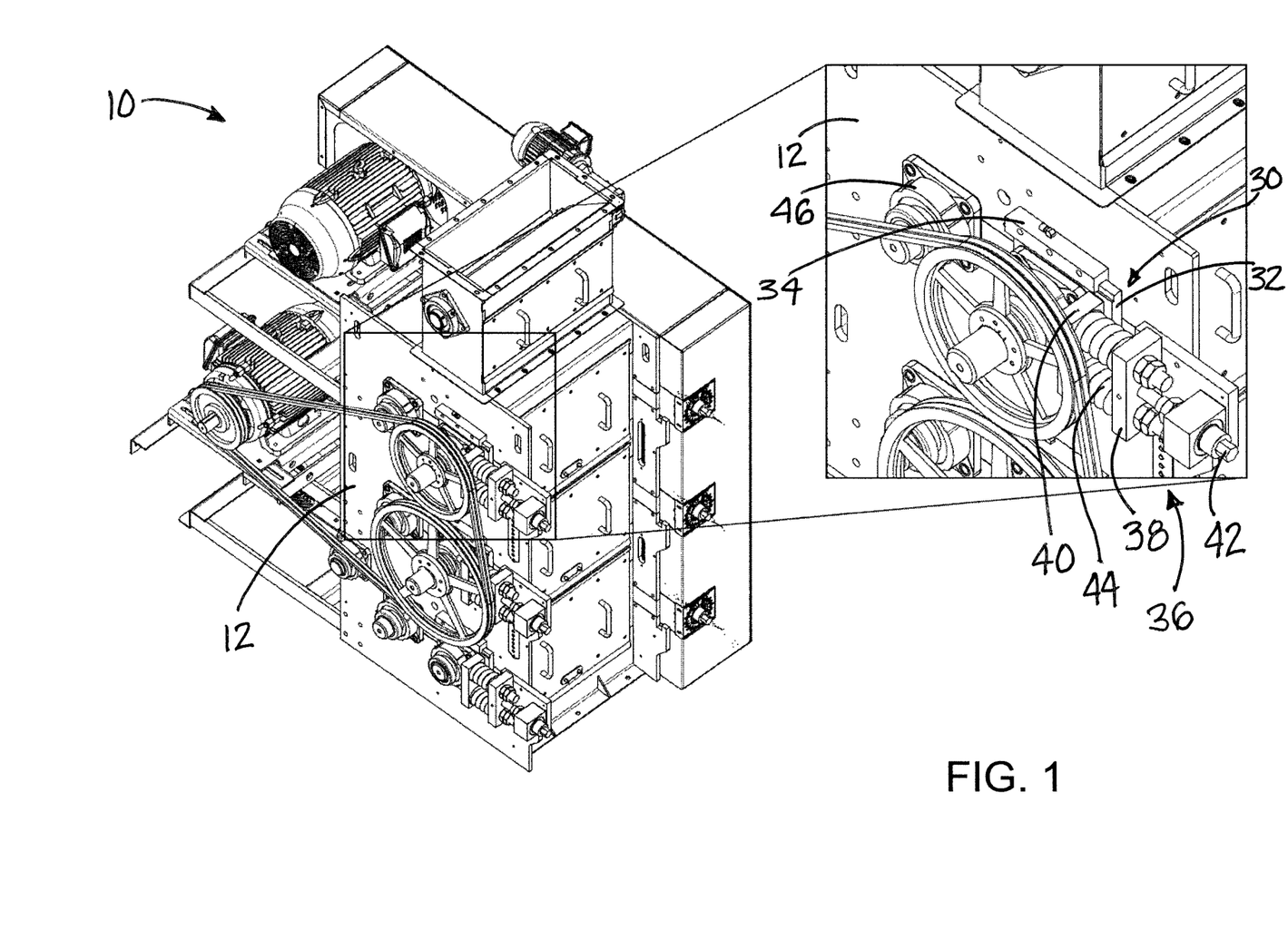
FIG. 1 is a schematic perspective view of an illustrative grinding apparatus suitable for employing the new roll adjustment system according to the present disclosure.
Figure 2:
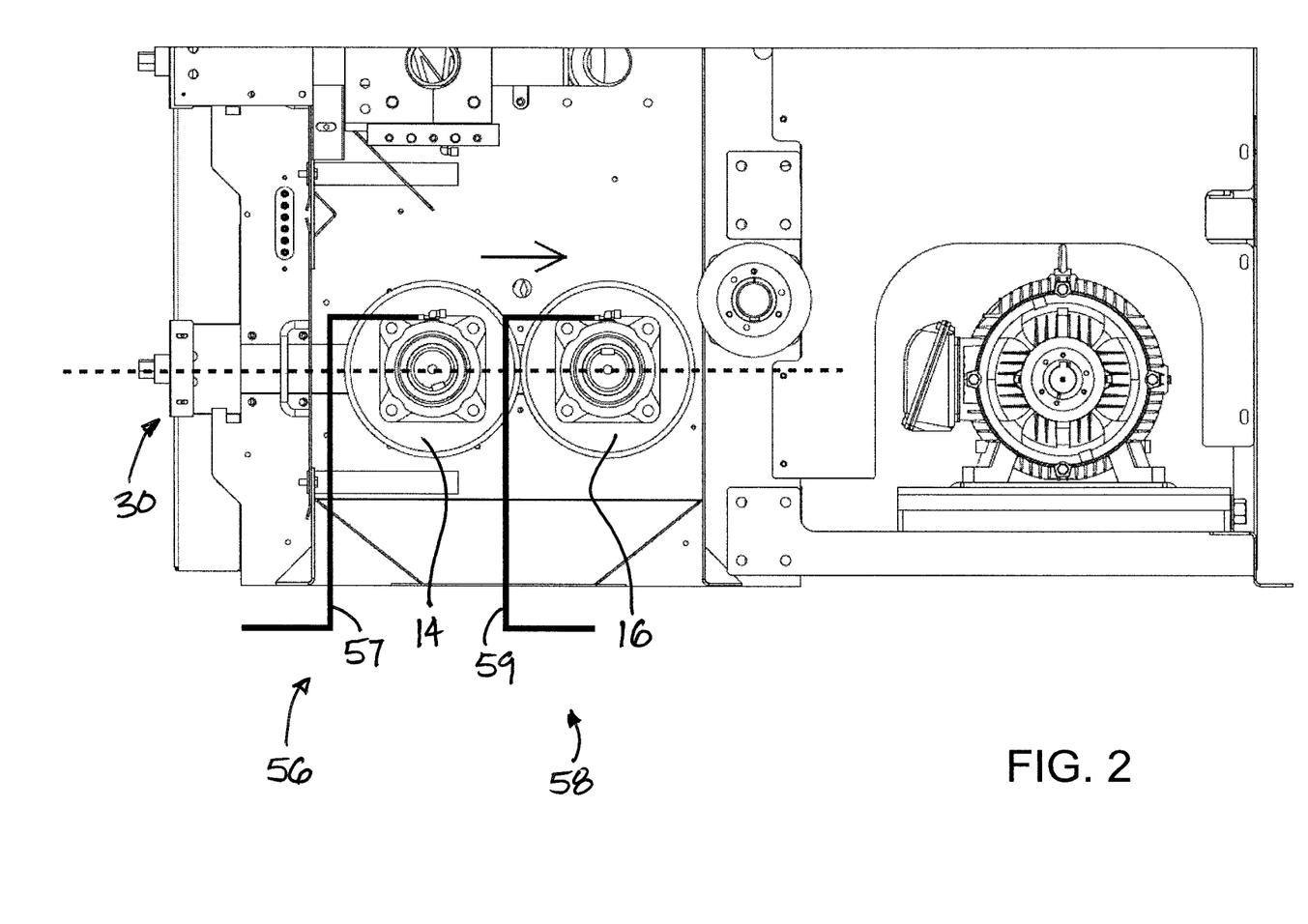
FIG. 2 is a schematic side view of a grinding apparatus with the new roll adjustment system, according to an illustrative embodiment.
Figure 3A:
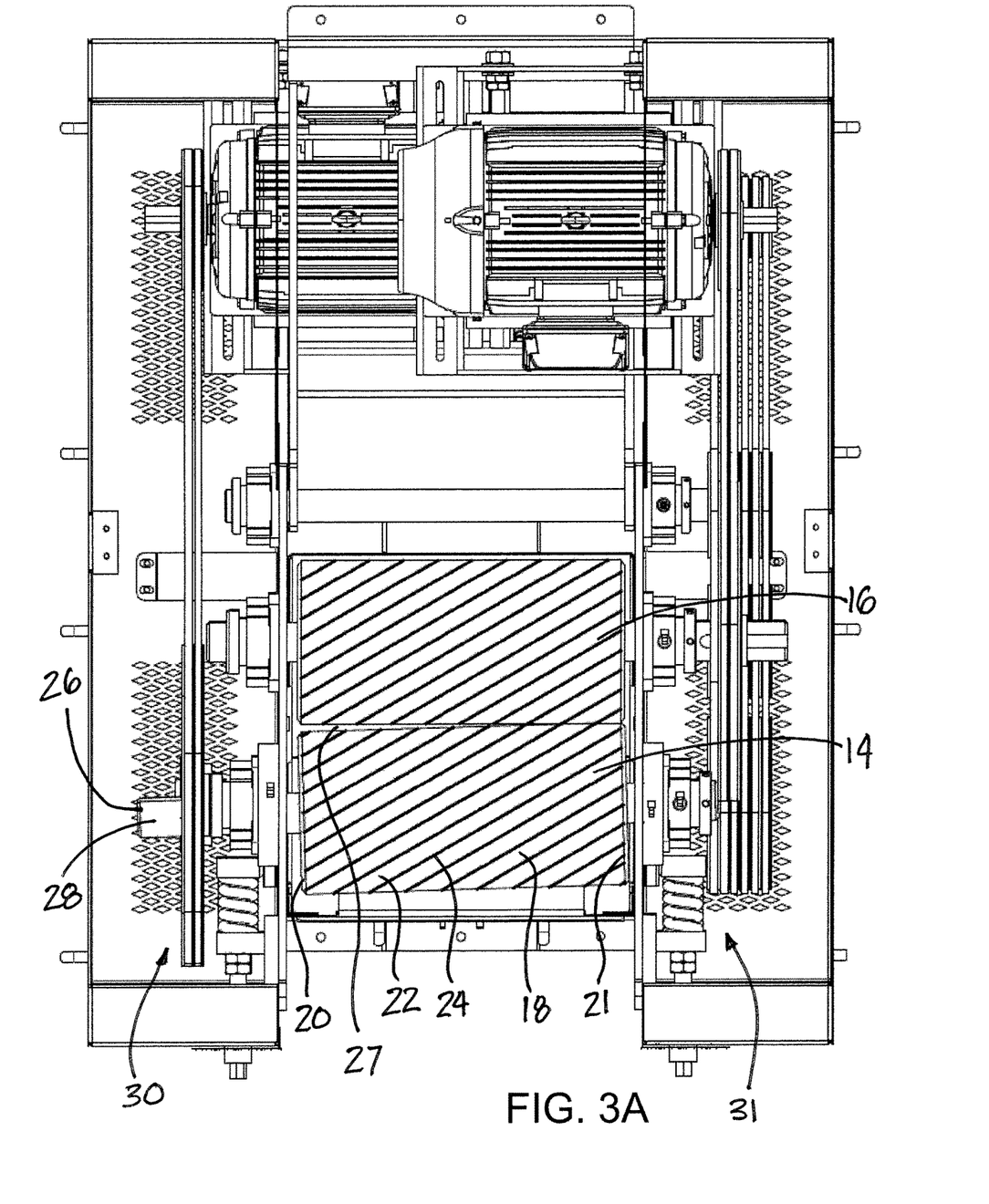
FIG. 3A is a schematic sectional view of the grinding apparatus with the roll adjustment system, according to an illustrative embodiment, with one end of the movable roll in a zero position with respect to the stationary roll and thus completing a circuit.
Figure 3B:
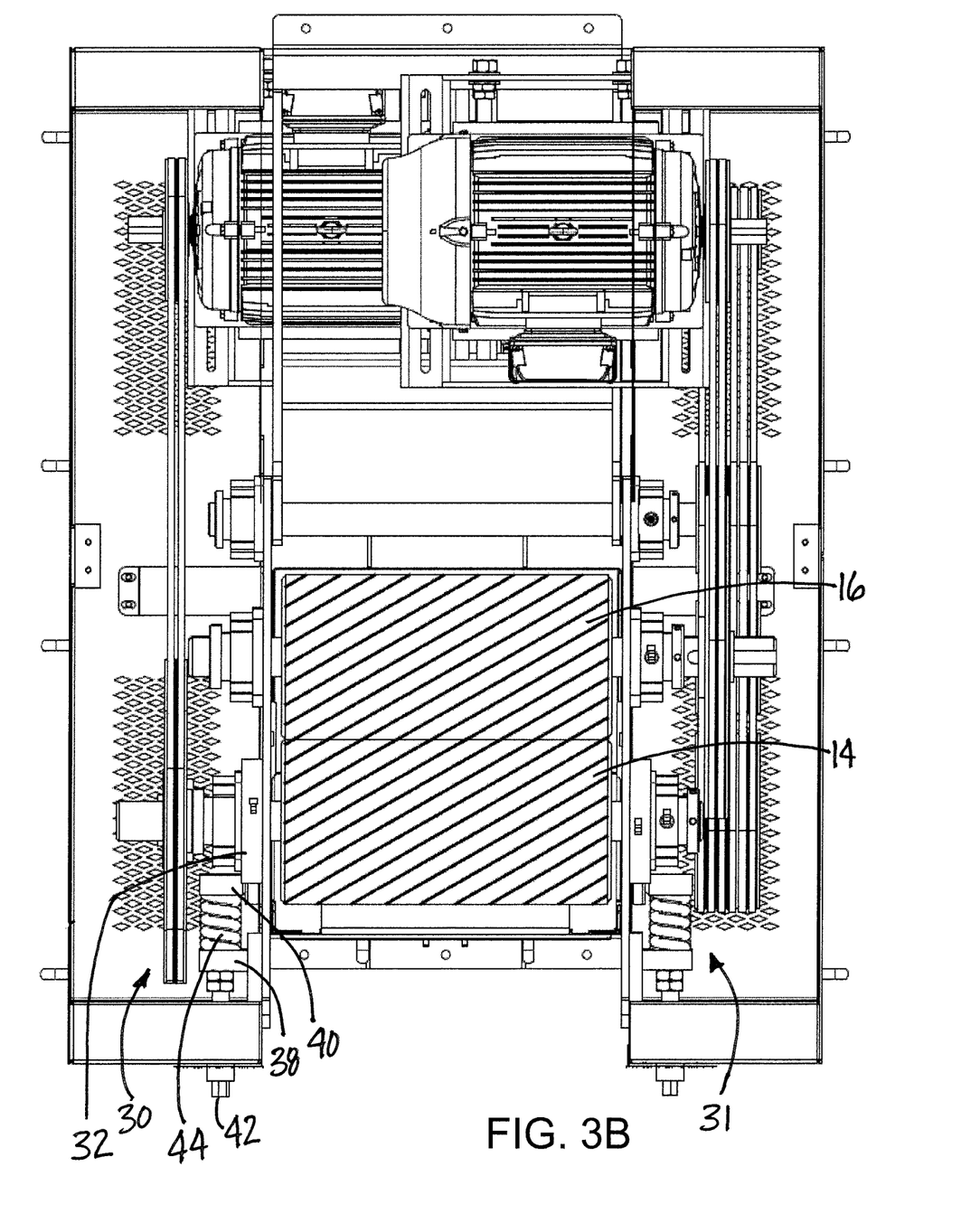
FIG. 3B is a schematic sectional view of the grinding apparatus with the roll adjustment system, according to an illustrative embodiment, with both ends of the movable roll in a zero position with respect to the stationary roll and thus completing a circuit.
Figure 3C:
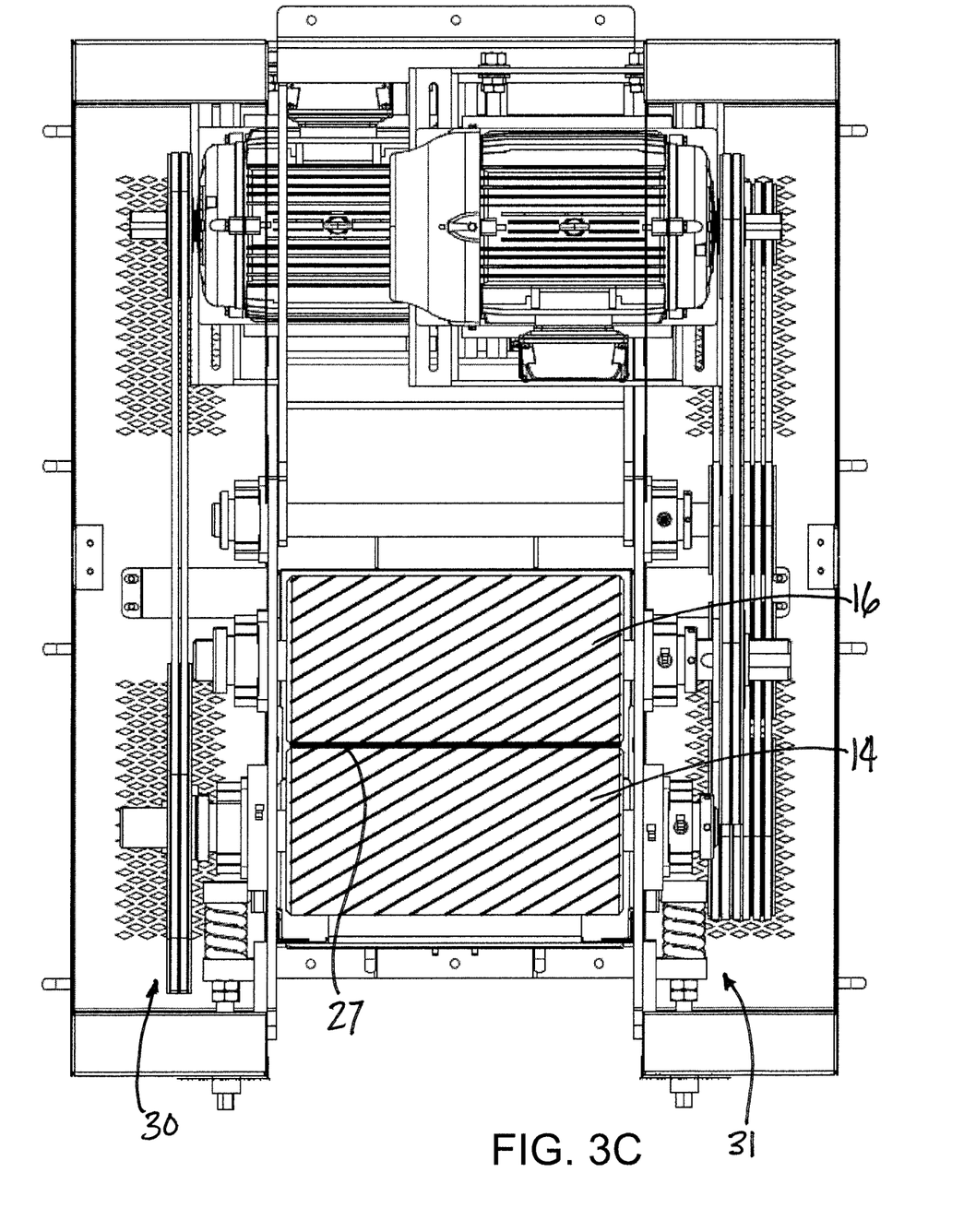
FIG. 3C is a schematic sectional view of the grinding apparatus with the roll adjustment system, according to an illustrative embodiment, with the movable roll separated by a uniform separation gap from the stationary roll and thus not completing the circuit.
Figure 4:
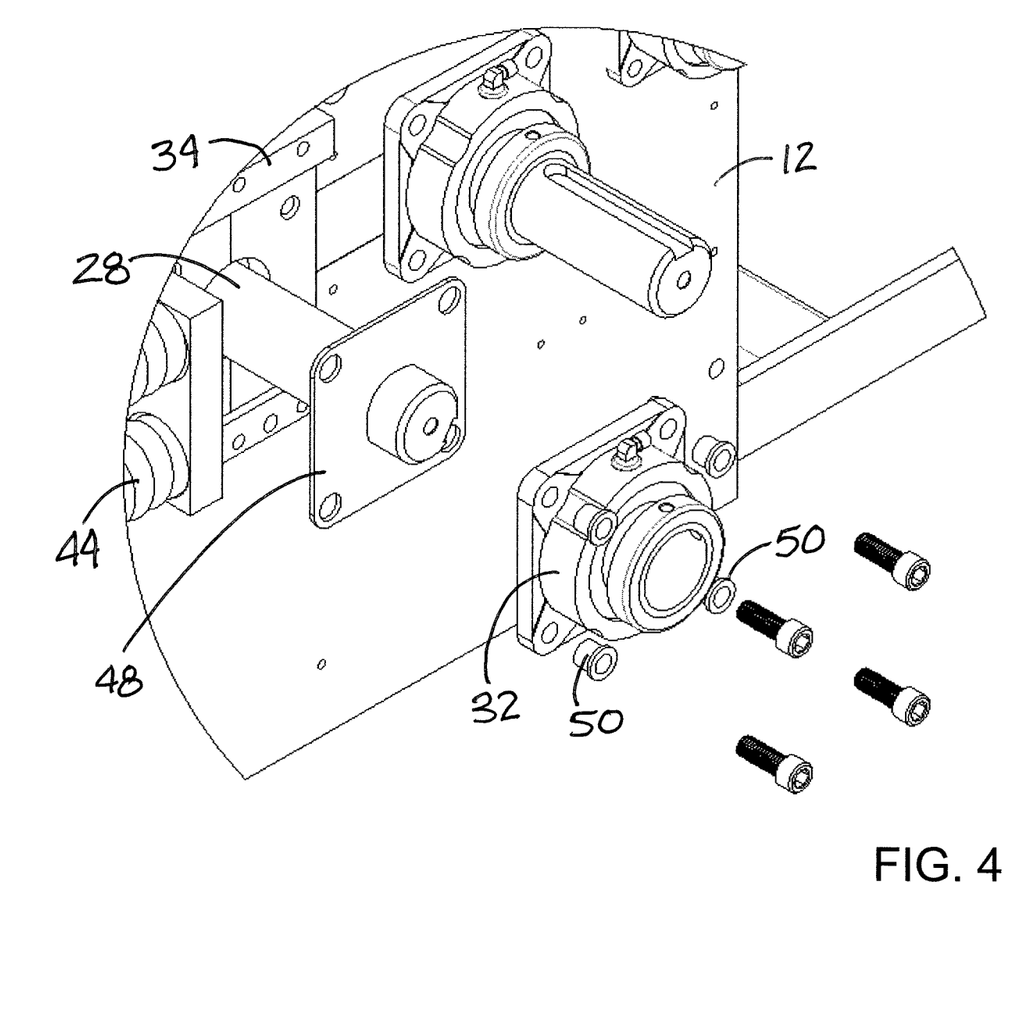
FIG. 4 is a perspective view of a portion of the system including an end portion of the first roll and the respective roll support with elements of the isolating assembly.

The system 10 may also include an electrical isolation assembly which is configured to electrically isolate or insulate at least one of the rolls 14, 16 from the frame, and may be employed to isolate both of the rolls 14, 16 from the frame. In some embodiments, the isolation assembly isolates the roll support that is supporting the isolated roll from the frame to thereby prevent an electrical current to travel between the frame and the roll support or the roll supported by the roll support. Illustratively, the electrical isolation assembly may comprise an insulating pad 48 which is configured to be positioned between the roll support for the isolated roll and the frame 12 to thereby electrically isolate the roll support from the frame by virtue of the insulating pad being positioned between the roll support and the frame. The electrical isolation assembly may also include at least one insulating sleeve 50 which is positioned over at least one fastener employed to mount the roll support to the frame, and is preferably positioned over each of the mounting fasteners employed to mount the roll support on the frame. The insulating sleeve 50 may be configured so that the shaft of the mounting fastener as well as any head or nut on the fastener is also electrically isolated from contact with the roll support. The insulating pad 48 and the insulating sleeve 50 may be formed from an electrically non-conductive material such as a plastic or composite.

Figure 5:
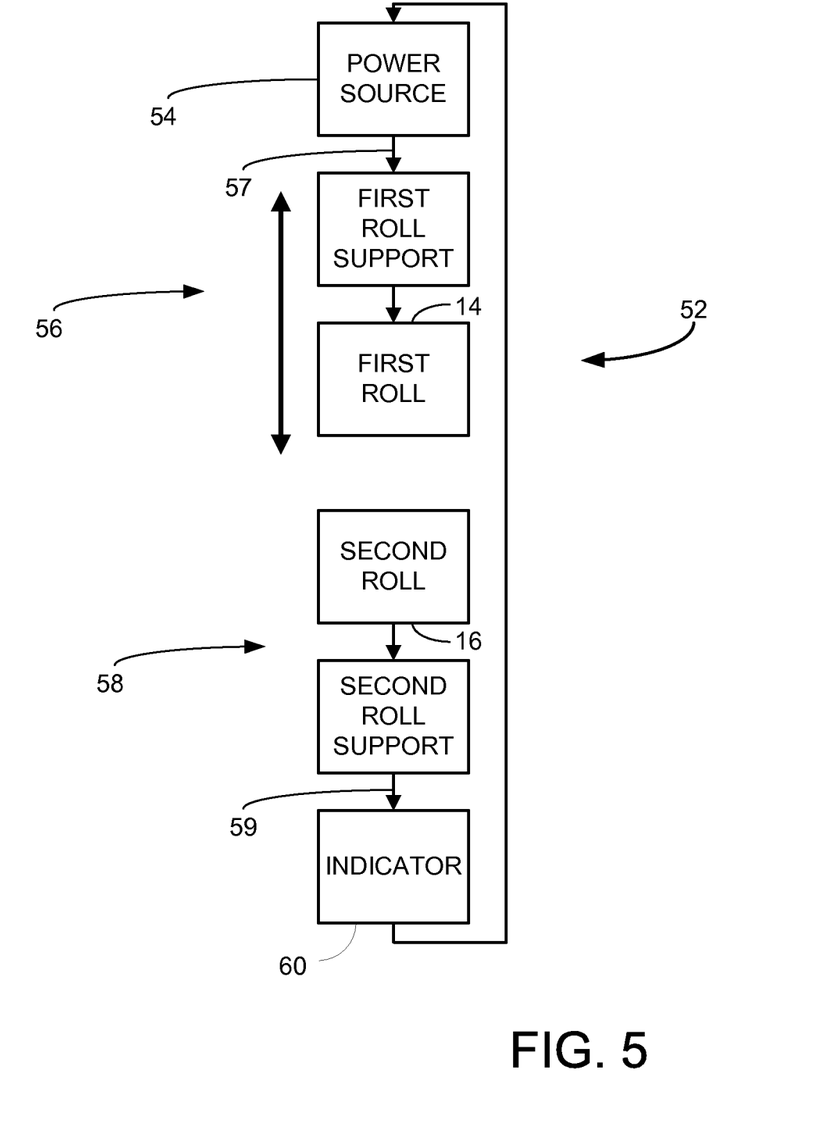
FIG. 5 is a diagrammatic view of elements of the system.

The system 10 may also include a detection apparatus 52 which is configured to detect contact between the rolls, and the detection apparatus may be configured to detect a change in electrical potential of at least one of the rolls which may result from contact between the rolls. The detection apparatus 52 may comprise a power source 54 which is configured to provide an electrical potential, and the power source may comprise a battery or the electrical service of a building supplied by a electrical utility. The detection apparatus 52 may also include a connection structure 56 which is configured to connect the power source 54 to the first roll 14. The connection structure 56 may include a first or connection conductor 57 which electrically connects the power source 54 to the first roll. The first conductor 57 may be connected to the roll support for the first roll, and illustratively may be electrically connected to the movable roll support assembly 30 for the first roll. For example, the first conductor 57 may be electrically connected to the bearing block 32 on which one of the end portions of the roll 14 is mounted. Usually the first conductor 57 may only need to be connected to one movable roll support assembly supporting one end portion of the roll shaft, particularly if the roll shaft is formed of an electrically conductive material such as steel. Conduction of electricity along an electrical path from the end portion of the roll shaft, through the roll shaft and through the roll body (or at least a portion thereof) to the conductive portion or portions of the circumferential surface 22 of the roll 14 effectively provides an electrical path between the connection structure 56 and the conductive portion of the surface.

The detection apparatus 52 may also include a reception structure 58 which is configured to connect the power source to the second roll 16 such that contact between the first 14 and second 16 rolls creates a complete electrical circuit through the rolls and to the terminals of the power source. The reception structure 58 may comprise a second or reception conductor 59 which may be electrically connected to the second roll support such as by a wire connected to the roll support. An electrical path may be formed between the roll support through the end portion of the roll shaft and roll body of the roll 16 to the conductive portion of the circumferential surface of the roll 16.

As the location of the rolls in the system 10 may be considered to be hazardous due to the presence of dust and fine particles, and therefore the circuit may utilize a limited current and voltage and may not permit any surge or accidental wire connection possibly allowing for a short circuit. An intrinsically safe barrier may be used on the input and output sides of the circuit. An illustrative circuit may utilize a voltage of less than 12 VDC and may limit current to less than 10 mA.

The system 10 may also include a signaling apparatus 60 which is configured to produce a signal that indicates that a change in the electrical potential of at least one of the rolls is detected, such as through the flow of current through the rolls resulting from contact between the rolls. The signaling apparatus 60 may be an element in the circuit formed by the power source 54, the connection structure 56, the rolls 14, 16, and the reception structure 58 such that a current flowing through the rolls is also caused to flow through the signaling apparatus.

The signaling apparatus 60 may be configured to produce a perceptible signal which is perceptible by one of the senses of a human being (e.g., visual, audible, or tactile) and/or may produce a signal in a digital or analog form that is able to be transmitted to a device able to receive and be triggered in some manner by the signal. The signaling apparatus 60 may be configured to produce a visually-perceptible signal or indicator such as a light emitting device (e.g., a bulb or LED) that illuminates to provide the visually-perceptible signal. The signaling apparatus may also comprise an audibly-perceptible signal or indicator that is able to be heard by an operator (e.g., a horn or buzzer or bell). The signaling apparatus may include an indicator that produces a tactilely-perceptible indicator such as a vibration or other form of movement that may be picked up by the touching of the skin to a surface or control. The types of signals described are not mutually exclusive and may be used in combination with each other.

The signal may also be in the form of a current or change in voltage potential that is provided to a logic element such as a programmable logic controller, processor, analog to digital converter, or other device that converts or processes the signal to a suitable form for control circuitry configured to act upon the detection of contact of the rolls. Apparatus that may utilize the signal may include devices that automatically adjust the position of the movable roll to a desired separation gap distance from the stationary roll intended to produce a ground material of a particular character.

Another aspect of the disclosure relates to a method of positioning a roll with respect to another roll in a system, such as a processing or grinding or milling apparatus. The method may include providing a system having some or all of the elements and features set forth in this disclosure, and applying an electrical potential to a first one of the rolls, such as by connecting the first roll to a terminal of an electrical power source, and electrically connecting a second one of the rolls to another terminal of the power source. The method may also include moving a movable one of the rolls toward a stationary one of the rolls, and may include moving one end of the movable roll toward one end of the stationary roll. A further aspect of the method may include detecting a change in the electrical potential in the second one of the rolls and/or detecting an electrical current flow from the first roll to the second roll, and producing a signal when a change in the electrical potential of the second roll, or a current flow, is detected. The method may further include discontinuing movement of the movable roll toward the stationary roll upon the detection, and determining a zero point for the movable roll when the change in electrical potential or current is detected.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps disclosed in the text and/or the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A dry grain particle grinding system defining a substantially vertical downward path for grain particles moving under the influence of gravity to be ground by the system, the system comprising:
    a frame, the frame including spaced walls defining a grinding space therebetween, each of the walls having an inner side toward the grinding space and an outer side opposite of the inner side;

a pair of grinding rolls positioned on opposite sides of the substantially vertical downward path to define a portion of the downward path and grind the material moving along the downward path, the grinding rolls including a first roll and a second roll, each of the rolls comprising:
  a roll body having opposite ends defining a length of the roll body between the ends, the roll body being positioned in the grinding space between the walls, the roll body having a circumferential surface, a plurality of teeth being formed on the circumferential surface, the plurality of teeth on the roll body extending substantially straight and continuously from a first one of the opposite ends to a second one of the opposite ends of the roll body;
  a roll shaft having end portions extending from the roll body, each of the end portions extending from one of the ends of the roll body, the end portions of the roll shaft extending through the walls of the frame and outside of the grinding space;
  a pulley mounted on one of the end portions of the roll shaft;
  wherein each roll shaft of the pair of rolls is rotatable about a rotation axis, the rotation axes of the roll shafts of the rolls defining a common horizontal plane and oriented perpendicular to the substantially vertical downward path of the material; and
  wherein a separation gap is defined by the grinding rolls through which material falls in the substantially vertical downward path, the separation gap extending in the common horizontal plane between the teeth on closest portions of the circumferential surfaces of the rolls, the separation gap in the common horizontal plane being uniform in width along the length of the roll bodies when the rotation axes are parallel to each other and at least one of the rolls is rotating;
roll supports mounted on the frame and configured to support the rolls on the frame such that the rolls are rotatable about the respective rotation axes in the common horizontal plane, the roll supports including:
  a pair of stationary roll supports supporting the second roll on the frame, the pair of stationary roll supports being mounted on the outer sides of the walls of the frame in a manner such that the stationary roll supports and the second roll are substantially immovable and fixed in position with respect to the frame;
  a pair of movable roll supports supporting the first roll on the frame, the pair of movable roll supports being mounted on the outer sides of the walls of the frame to move horizontally along the outer sides of the frame to move the rotation axis of the first roll toward and away from the rotation axis of the second roll to thereby adjust a horizontal distance relationship between the pair of movable roll supports and the pair of stationary roll supports, the pair of movable roll supports including a first movable roll support supporting a first said end portion of the roll shaft of the first roll in a manner movable with respect to a first said wall of the frame and a second movable roll support supporting a second said end portion of the roll shaft of the first roll in a manner movable with respect to a second said wall of the frame such that the rotation axis of the first roll is movable in the common horizontal plane with respect to the second roll to adjust a size of the separation gap in the common horizontal plane between the grinding rolls through which grain particles fall on the substantially vertical downward path;
  wherein the first movable roll support is movable with respect to the frame independent of movement of the second movable roll support with respect to the frame such that the end portions of the first roll are independently movable toward and away from the second roll in the common horizontal plane to adjust the size of the separation gap between the teeth on the roll bodies of the first and second rolls;
  wherein each of the first and second movable roll supports comprises a movable roll support assembly including:
    a bearing block receiving one of the end portions of the roll shaft of the movable first roll and being mounted on the frame to move the bearing block in the common horizontal plane and the end portions of the movable roll in the common horizontal plane; and
    an adjustment structure configured to adjust a position of the bearing block with respect to the frame, the adjustment structure being mounted on a respective said wall of the frame, the adjustment structure including an adjustment member lying in the common horizontal plane and being configured to act on the movable bearing block along a horizontal axis lying in the common horizontal plane of the roll shafts of the pair of rolls; and
a motor operatively connected to the pulleys on the roll shafts of the pair of grinding rolls to rotate the grinding rolls in a rotational direction such that the rotation of the rolls cause the grain particles to move in a downward direction along the substantially vertical downward path.

* * * * *